Patented Feb. 5, 1946

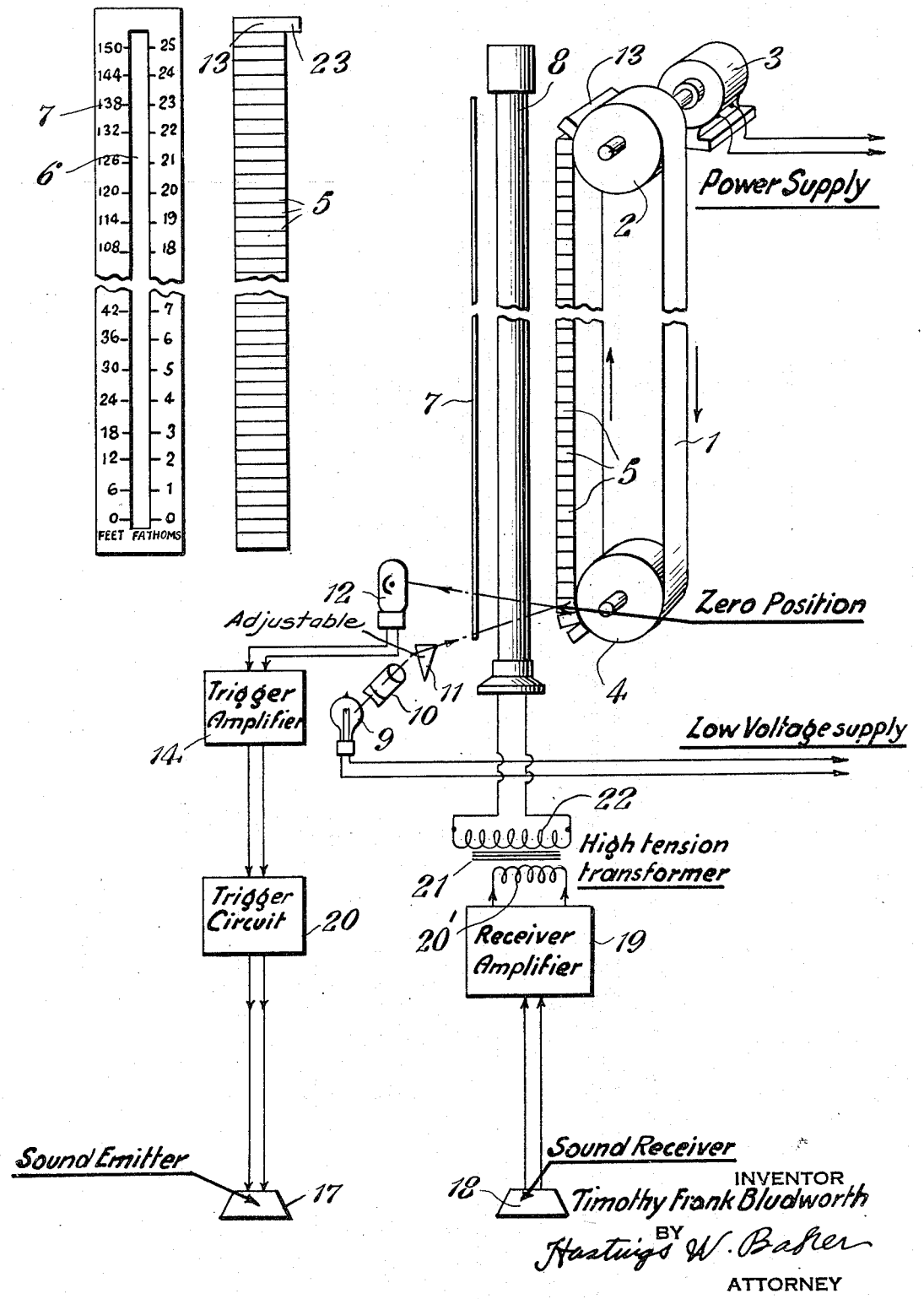

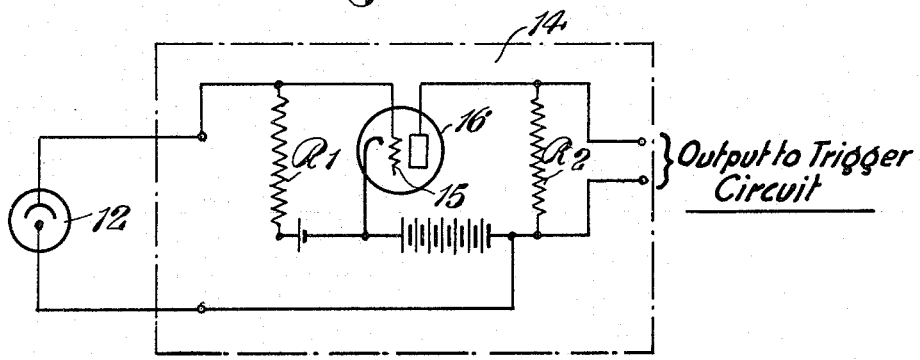
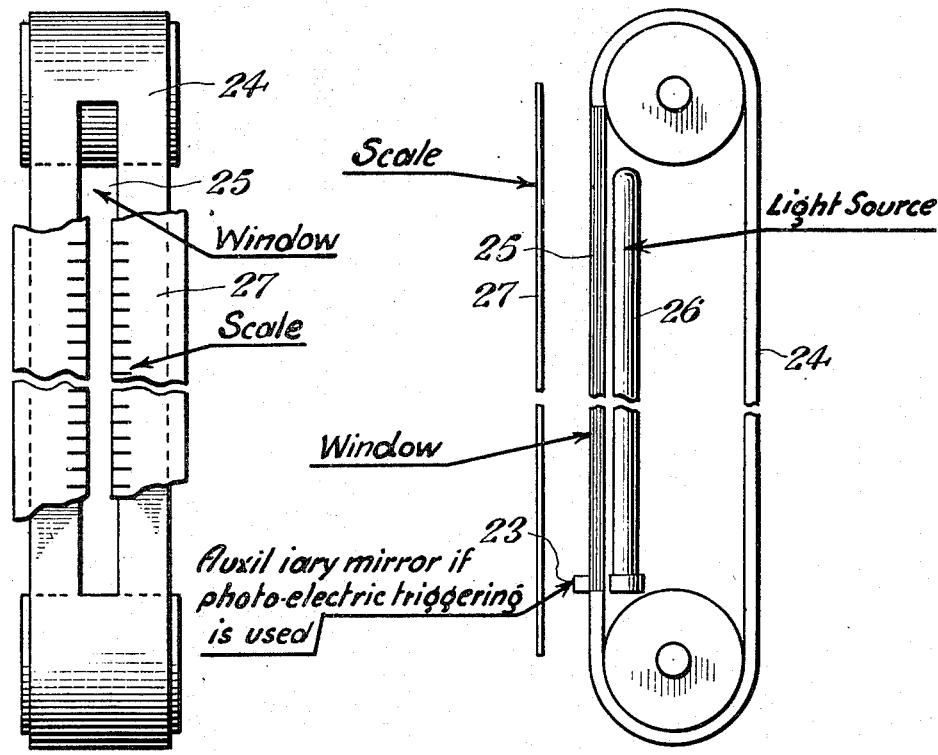

2,394,288

UNITED STATES PATENT OFFICE 2,394,288

INTERVAL METER AND INDICATOR THEREFOR

Timothy Frank Bludworth, Summit, N. J., assignor to National-Simplex-Bludworth, Inc., a corporation of Delaware Application August 21, 1941, Serial No. 407,780

4 Claims. (Cl. 177—386)

This invention relates to an interval meter and indicator therefor adapted to indicate any phenomena associated with the occurrence of two events which occur as some function of time. Although the essential features of this invention may be utilized through many and various applications, I have shown herein the application thereof particularly suitable for indicating echo distances which are inherently measured by the time interval existing between the instant of transmission of the signal and instant of receipt of the echo of that signal.

The invention may be better understood by referring to the attached drawings in which:

Figure 1 is an elevational view thereof.

Figure 1a is a front elevational view of the indicator scale.

Figure 1b is a face view of the belt with the mirrors thereon.

Figure 2 is a diagrammatic view of one of the circuits employed therein.

Figure 3 is a side elevational view of a modification thereof, and

Figure 4 is a front elevational view of the mechanism shown in Figure 3.

Referring to Figures 1 and 1a, there is an endless belt 1 constructed of a flexible durable material which is moved at constant speed by a pulley 2 driven by constant speed motor 3. The lower end of the belt passes over an idler pulley 4. On the belt 1 are a series of narrow mirrors 5, the uppermost of which is mirror 13 having a portion 23 extending to one side of the belt. The mirrors are made narrow so that they will easily pass around the pulleys as shown at the upper and lower portions of the belt as shown in Figure 1. These mirrors should extend around only a portion of the belt and should preferably extend for about the same distance as the total height of the rectilinear indicator slot 6 in the plate 7. Plate 7, adjacent the slot 6, has indicia on one side thereof representing feet and on the other side thereof representing fathoms. Of course, other suitable indicia may be employed. Instead of using mirrors 5, any substance may be employed which would reflect light. The direction of rotation of the belt is indicated by the arrows in Figure 1. It will, of course, be understood that the plate 7 is placed in front of the reflectors 5 so that the reflectors can reflect a beam of light from the neon tube or other suitable lamp 8 through the slot 6.

If so desired, the light 8 may be illuminated during the entire interval between the actuation of the sound emitter and the reception of the echo, or it may be illuminated only momentarily when the echo is received.

A source of light 9, such as a low voltage incandescent lamp, is focused on the zero position of the belt through a suitable optical arrangement such as a collector lens 10 and a prism 11. The purpose of this arrangement is to trigger the transmitter by means of energizing a photoelectric cell 12 with a light reflected from the extension 23 of the uppermost mirror 13 at the instant the first reflector 13 arrives at the zero position. The prism, of course, may be rotated to effect a zero adjustment to correct for any inherent lag in the system or for any reason where it is desired to change the zero position. The triggering of the transmitter may be accomplished by any suitable means, and the means herein shown is indicated by way of illustration only.

The output of the photoelectric cell is introduced in the conventional type of amplifier 14 for operating the trigger circuit. This amplifier may consist of one or more stages of amplification, and in Figure 2 I have illustrated one amplification circuit in which the grid 15 of the triode 16 is biased for either negligible or zero plate current. When light incident upon the photoelectric cell 12 causes current to flow in the resistor $R_1$, the grid 15 of the triode is acted upon by the voltage drop across the resistor $R_1$, which, being more positive than the bias voltage, causes plate current to flow, producing a voltage drop in the plate resistor $R_2$, which is taken as the output for controlling the trigger circuit. The trigger circuit 20 may be any of the usual types such as a switch operated by a relay, glow discharge tube circuit or other means which will cause a signal to be sent out from the sound emitter 17. The sound emitter 17 may be of any suitable type, either sonic or supersonic, and the signal emitted therefrom travels to the bottom of the ocean or other reflecting surface from whence it travels back to the sound receiver 18. The sound receiver may be of any type adapted to change a sound wave into a variation in electric current which is then amplified by the receiver amplifier 19 connected to the primary 20' of a high tension transformer 21, the secondary 22 of which is connected to the light 8.

The light 8 is preferably a long, tubular source of light such as a long, neon tube. This source of light must be capable of reaching sufficient intensities of illumination within a very short period of time and must extend at least over the length equal to the height of the scale. The lamp or neon tube is positioned so that its light is reflected from the reflecting surfaces 5 on the belt through the slot 6 in the plate or scale 7.

When the uppermost reflecting surface 13 passes the zero position, it will reflect the light from the incandescent lamp 9 to the photoelectric cell 12, and the signal will be sent out or transmitted. While the signal is traveling to the bottom of the ocean or other reflecting surface and is returning as an echo to be picked up by the receiver 18, the uppermost reflecting surface 13 will have traveled upwardly together with the reflecting surfaces beneath it. When the echo is received and the neon tube 8 is thereby illuminated, the observer will see through the slot 6 the height to which the reflecting surfaces have traveled upwardly during that interval, and he can read this in feet or fathoms on the scale. The light immediately goes out, but will be repeated on the next cycle of operations. If the neon tube circuit were of the type such as that in which the tube would be illuminated during the entire interval between the sending of the signal and the receipt of its echo, the observer would note a rising column of light which would disappear at the moment of the receipt of the echo. It is obvious that the distance that the uppermost reflecting surface moves from the time when the signal was sent out, at which time this uppermost surface was in its zero position, until the echo is received, at which time the light goes out, would be a function of the depth of the ocean or the distance to the object which sent back the echo.

Instead of having a series of reflecting surfaces 5, it would be possible to have only one reflecting surface 23, as shown in Figure 3, or only the uppermost reflecting surface 13, as shown in Figure 1. In this case this reflecting surface would trigger the sending circuit, and when the echo came in, the observer would see how far this one reflecting surface had moved relative to the scale.

It is not essential to have a slot 6 in opaque material such as a plate 7, for the entire indicator 7 may be of translucent material or may be of ground glass with red figures indicating feet and green figures indicating fathoms. In this case we would not need a slot 6 in the scale.

Of course, the photoelectric cell can be eliminated by providing any suitable switch mechanism to open the circuit in the receiving circuit at the instant the uppermost reflecting surface 13 passes the zero point.

The reason the extension 23 is provided on the uppermost reflecting surface 13 is because the sending circuit should be triggered only once during one complete cycle of operations or one complete rotation of the belt. If the light from the lamp 9 fell on all of the mirrors, it is obvious that the sending transmitter would constantly be energized, whereas it is desired to energize it only at the commencement of the operation, which is when the extension 23 of the light reflecting surface 13 is passing its zero point.

In Figures 3 and 4 I have shown a modification in which the extension 23 serves as a means to trigger the sending circuit, but instead of employing a belt with reflecting surfaces, I employ a belt 24 having a window 25 therein, which window may be either open or composed of translucent material. In any case the light from the tube 26, similar to the tube 8, shines through the window 25 on to the scale 27 in front thereof. Of course this scale would have suitable indicia thereon, as in the case of the scale shown in Figure 1a. It will further be noted that the tube 26 is placed between the opposite pulleys so that its light shines through the window, whereas in the case of Figure 1, the tube 8 shines its light onto the reflecting surfaces of the mirrors which reflect it onto the scale. The operation, however, in both cases is identical. The essential feature, therefore, of the invention is to provide a light responsive element on a movable member such as a belt. The light responsive element either directly controls the sending signal or passes through an initial or zero position at the time the initial signal is transmitted. The light responsive element is then illuminated at the moment of the receipt of the echo. The light responsive element would be illuminated at the moment of the receipt of the echo regardless of whether the light had remained lit during the interval of time, or was momentarily illuminated at the end of the interval of time. By light responsive element, I mean to include any form of mirrors or light reflecting or diffusing material, as well as transparent or translucent material, such as shown in the embodiment of Figures 3 and 4. Regardless of whether it is a reflecting surface or a light transmitting medium, it would still be a light responsive element.

It is obvious that many changes may be made in the specific form of the invention, as shown by way of illustration herein, without departing from the spirit of the invention. I, therefore, desire to claim the same broadly, except as I may limit myself in the appended claims.

I claim:

1. In combination, a fixed light, a signal transmitter, a belt, means to move the belt at constant speed, two relatively displaced reflecting surfaces on the belt, one of the reflecting surfaces extending to one side of the other reflecting surface, the said reflecting surfaces extending over only a portion of the length of the belt, a light sensitive cell, means to focus the light so that as one of the reflecting surfaces passes a predetermined point, the light will be reflected to said light sensitive cell, means controlled by said cell to actuate the transmitter, a second light and means to actuate the second light so as to illuminate the other reflecting surface at the end of a time interval after the actuation of the transmitter.

2. In combination, a fixed light, a signal transmitter, a belt, means to move the belt at a predetermined constant speed, a reflecting surface on the belt, the reflecting surface extending over only a portion of the length of the belt, a second reflecting surface carried by the belt, the second reflecting surface extending to one side of the first reflecting surface, a light sensitive cell, means to focus the light so that as the second reflecting surface passes a predetermined point the light will be reflected to said cell, means controlled by said cell to actuate the transmitter and means to illuminate the first named reflecting surface at the end of a time interval after the actuation of the transmitter.

3. In combination, a fixed light source, a lens to focus a pencil of light from said light source, a prism movable to change the focal position of the light, a movable belt, a photoelectric cell, and means carried by said belt to cause the light to fall on said cell when and only when the said means passes the focus of said pencil of light.

4. In combination, a fixed light source, a lens to focus a pencil of light from said light source, a movable belt, a photoelectric cell, means carried by said belt to cause the light to fall on said cell when said means passes the focus of said pencil of light and means to vary the focal position of said pencil of light.

TIMOTHY FRANK BLUDWORTH.